United States Patent [19]

Balech

[11] Patent Number: 4,825,437
[45] Date of Patent: Apr. 25, 1989

[54] CLOCK RECOVERY ARRANGEMENT ESPECIALLY FOR AN INFORMATION TRANSMISSION SYSTEM USING THE TDMA PRINCIPLE IN ONE TRANSMISSION DIRECTION

[75] Inventor: Jean-Pierre Balech, Brive, France

[73] Assignee: Telecommunications Radioelectriques et telephoniques t.r.t., Paris, France

[21] Appl. No.: 40,382

[22] Filed: Apr. 16, 1987

[30] Foreign Application Priority Data

Apr. 22, 1986 [FR] France .................................. 8605785

[51] Int. Cl.⁴ ............................. H04J 3/06; H04L 7/02
[52] U.S. Cl. ..................................... 370/104; 375/120; 331/1 A; 328/55
[58] Field of Search ................... 370/104, 95; 375/120, 375/107, 87, 81, 95, 110; 455/12, 260, 265; 331/1 A; 328/55; 360/41

[56] References Cited

U.S. PATENT DOCUMENTS 4,498,103  2/1985  Aschwanden ...................... 375/120
4,587,661  5/1986  Schiff ................................... 370/104
4,651,026  3/1987  Serfaty et al. ...................... 375/120

Primary Examiner—Douglas W. Olms
Assistant Examiner—Marianne Huseman
Attorney, Agent, or Firm—Thomas A. Briody; Jack E. Haken; Anne E. Barschall

[57] ABSTRACT

Clock recovery arrangement suitable more specifically for an information transmission system using the TDMA principle in one transmission direction.

A clock recovery arrangement (24, 13) employed in an information transmission system comprised of a central station (1) and remote stations (2, 3, 4, 5, . . . ). Each station has at least one transmitter circuit (11, 21, 23, 31, 41, 51) and one receiver circuit (12, 20, 22, 30, 40, 50). The information components are time-division muliplexed in the direction from the central station to the remote stations and are transmitted in accordance with the TDMA principle in the other direction. The clock signal H of the multiplex direction is used in the TDMA direction to set the frequency of a first phase-locked loop, while a second loop ensures a fast phase reset. This clock recovery arrangement constituted by this dual loop thus satisfies the requirements as regards precision and reduction of the residual jitter.

6 Claims, 3 Drawing Sheets

CLOCK RECOVERY ARRANGEMENT ESPECIALLY FOR AN INFORMATION TRANSMISSION SYSTEM USING THE TDMA PRINCIPLE IN ONE TRANSMISSION DIRECTION

BACKGROUND OF THE INVENTION

1. Field of the Invention

The present invention relates to a clock recovery arrangement which is especially suitable for an information transmission system using the time-division multiple-access (TDMA) principle in one transmission direction. The system a central station and remote stations, each station having at least one transmitter circuit and one receiver circuit. Information sent by the transmitter circuit of the central station to the receiver circuit of the remote stations is time-division multiplexed and synchronized by means of a phase-locked loop producing at least a multiplex clock signal. Information sent by the transmitter circuits of the remote stations is transmitted to the receiver circuit of the central station in accordance with the TDMA principle and is synchronized by the clock recovery arrangement. The clock recovery arrangement includes at least a phase comparator, a programmable frequency divider, an oscillator applying a reference signal to the programmable frequency divider.

2. Prior Art

Such clock recovery arrangements are well-known, particularly the arrangement described in U.S. Pat. No. 3,983,498. In that patent the clock recovery arrangement uses the output signal of a non-controlled oscillator as a reference signal. This output signal is divided by means of programmable divider and thereafter compared by means of a phase comparator to the signal conveying the binary information components at a rate of 24 kbit/s. The output of the phase comparator is fed back to a control input of the programmable divider in order to modify the division performed by the divider and thus leads to synchronization of the input information components.

A first disadvantage of such an arrangement using a non-controlled oscillator is that at its output a residual jitter remains. The jitter makes it impossible to handle the information components effectively and with precision. This difficulty is greater when the transmission rate amounts to some Mbit/s.

A second disadvantage of such an arrangement is that the phase comparator whose output is not "smoothed" results in too coarse a quantization of the programmable divider to obtain fast and accurate synchronization.

SUMMARY OF THE INVENTION

The present invention has for its object to provide an arrangement of the type defined above which does not have the disadvantages of the prior art arrangement.

To that end, the clock recovery arrangement of the type described in the opening paragraph is characterized in that it includes a dual loop for a fast phase reset. The first loop includes said oscillator which is locked onto said multiplex clock signal and which applies said reference signal to the second loop. The second loop includes inter alia said phase comparator and said programmable frequency divider.

A further object of the invention is to provide an effective and fast clock recovery as regards the number of bytes assigned to the synchronization phases. This number of bytes must be as low as possible compared with the total number of bytes per frame. Simultaneously, the clock recovery must satisfy precision and jitter-reduction requirements. The basic idea of the invention is to use the multiplex clock signal, which is stable and precise, for an effective frequency setting of the dual phase-locked loop, this dual loop whose frequency is controlled in this way then effecting a fast phase reset.

Similarly, the clock recovery arrangement according to the invention is characterized in that said programmable divider is preceded by a sequential digital filter used to average the input information for the programmable divider. Thus the clock recovery arrangement is advantageously and rapidly set as to its frequency and is accurately set as regards its phase.

In addition, the clock recovery arrangement is characterized in that the frequency of said reference signal produced by said controlled oscillator is a multiple of the frequency of said multiplex clock signal. The temporal accuracy of the clock recovery is thus increased since locking the dual loop onto the multiplex clock signal is effected at a high frequency.

BRIEF DESCRIPTION OF THE DRAWING

The following description given by way of example with reference to the accompanying drawings, will make it better understood how the invention can be put into effect.

DETAILED DESCRIPTION OF THE PREFERRED EMBODIMENT

Figure 1:
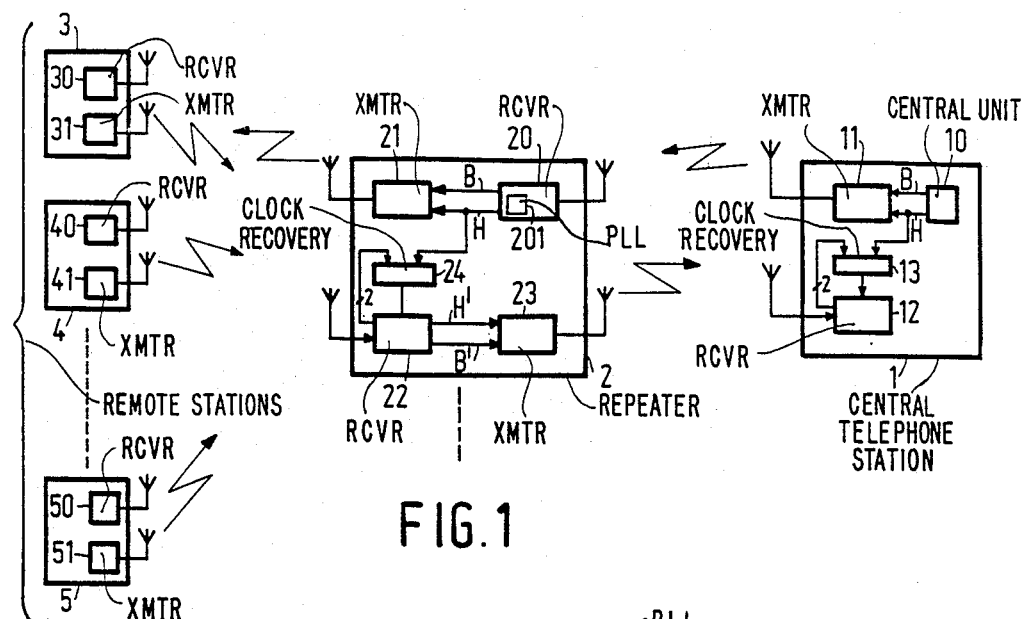
FIG. 1 shows schematically an information transmission system utilising the clock recovery arrangement according to the invention.

FIG. 1 shows schematically an information transmission system in which the clock recovery arrangement according to the invention is used. The system shown is a radio relay system of the point-to-multipoint type generally used in rural telephone equipment. A single central station 1 communicates with n remote stations, for example the repeater station 2 and the end stations 3, 4, 5, .... Depending on the configuration of the system as regards the number of subscribers and the area to be served, there may be one or a plurality of repeater stations or even no repeater station at all.

The information components conveyed by the central unit 10 of the central station 1 are applied in the form of binary signal B plus clock signal H to the modulator of the transmitter circuit 11, the binary signal B is transmitted to the receiver circuit 20 (or to the plurality of receiver circuits when there is more than one repeater station) of the repeater station 2, the binary signal B and the clock signal H recovered by means of a phase-locked loop 201 are transmitted to the transmitter circuit 21 which transmits the binary information components to the various receiver circuits 30, 40, 50, ... of the end stations 3, 4, 5, ....

Thus the central station 1 transmits the information omnidirectionally and simultaneously to the set of n remote stations which select the information components intended for them, this in the transmission direction which will be denoted as the multiplex direction.

Inversely, because the remote stations cannot all transmit simultaneously, they have a special time interval assigned to them during which they can transmit their information to the central station, this technique being known as time-division multiple-access (TDMA) and so this transmission direction will be denoted the TDMA direction.

The information sent by each remote station is partitioned in what are commonly called packets.

The number of packets is linked with the number of telephone channels the system can handle. In addition to the telephone channels a predetermined number of packets are provided for managing the system. For example, two packets can be associated, for the purpose of management, with 30 packets used for telephone channel transmission, resulting in a total of 32 packets. For each packet, the number of bytes relating to the information to be transmitted is chosen such that the real transmission period is sufficiently long with respect to the time needed for putting the transmitter and receiver circuits in operation, but sufficiently short with respect to the time needed for arranging the information into packets to avoid disturbing echoes during a telephone conversation. Thus, a length of 64 bytes of pure information corresponds to a packet transmission period of, for example, 8 ms. Service bytes (for example 8) are added to these information bytes to improve the efficiency of the transmission, which entails increase in transmission rate. A predetermined number of service bytes are reserved for the actual clock recovery.

The different packets are transmitted by the transmitter circuits 31, 41, 51, ..., of the end stations 3, 4, 5, ..., to the receiver circuit 22 (or a plurality of receiver circuits when there is more than one repeater station) of the repeater station 2, thereafter the transmitter circuit 23 of the repeater station 2 transmits the packets to the receiver circuit 12 of the central station 1.

In accordance with the invention, there is provided a clock recovery arrangement (13, 24) which is suitable for an information transmission system using the time-division multiple-access (TDMA) principle in one transmission direction. The system includes a central station(1) and remote stations (2, 3, 4, 5, ...). Each station has at least one transmitter circuit (11, 21, 23, 31, 41, 51, ...) and a receiver circuit (12, 20, 22, 30, 40, 50, ...). The information components transmitted by the transmitter circuit (11) of the central station (1) to the receiver circuits (20, 30, 40, 50, ...) of the remote stations (2, 3, 4, 5, ...) are time-division multiplexed and synchronized by means of a phase-locked loop (201, described with reference to FIG. 2) producing inter alia a multiplex clock signal (H). The information components transmitted by the transmitter circuits (23, 31, 41, 51, ...) of the remote stations (2, 3, 4, 5, ...) are transmitted to the receiver circuit (12) of the central station (1) in accordance with the TDMA principle and are synchronized by the clock recovery arrangement (13, 24) which comprises at least a phase comparator, a programmable frequency divider and an oscillator applying a reference signal to the programmable frequency divider. Said clock recovery arrangement (13, 24) is characterized in that it includes a dual loop (described with reference to FIG. 3) for a fast phase reset. The first loop includes the oscillator which is locked onto the multiplex clock signal H. The first loop applies the reference signal to the second loop, which includes inter alia the phase comparator and the programmable frequency divider.

Thus, during the packet transmission, the information components are applied to the modulator of the transmitter circuit (23, 31, 41, 51, ...) in the form of a binary signal plus a clock signal (B+H). The clock (H) is only provided for fixing the sampling instants.

During the receiving phase of the stations (1, 2, ...), the information components must be applied to the output of the demodulator of the receiver circuit (12, 22, ...) in the same format of binary signal B' plus clock H'. Since only the binary signal B' is transmitted via radio, the clock H' must be recovered from the transitions in the demodulated binary signal, i.e. a clock recovery operation has to be performed.

If this operation is to be effected correctly, it cannot be performed on the binary information signal corresponding to the speech signal, because there is only a very small probability that a transition is obtained at each transmitted bit. The sequences of 1 or 0 are rather frequent in a speech signal. To ensure correct clock recovery, clock bytes are sent at each start of the transmission of a packet, thus producing a transition at each transmitted bit. The clock recovery phase is of necessity achieved at the end of the reception of these bytes.

In the information transmission system used, a four state modulation (4−QAM=4-state Quadrature Amplitude Modulation, a non-limitative choice for employing the invention) has been opted for. Thus two half-rate binary frames are received. Only half the number of the transmitted transitions is received, but that number is received twice.

Thus, in the TDMA transmission direction, for example five bytes are reserved for the clock recovery, that is to say 40 bits or 2×20 transitions at the output of the receiver circuit. For the case of a clock recovery by means of a phase-locked loop, thinking that it is possible to obtain a correct frequency stability simultaneously with a very fast phase recovery, is wishful thinking. This consideration has lead Applicants to an advantageous separation of these two functions. The multiplex clock signal H, recovered by means of the phase-locked loop 201 in the repeater station 2, is used by the clock recovery arrangement 24 for an effective frequency setting. This signal H is applied to one input of the arrangement 24, whose second input receives the binary signal (2 binary data streams) after demodulation by the demodulator of the receiver circuit 22. The arrangement 24 whose frequency is controlled thus then effects a fast phase reset. The same holds for the central station 1 when there is a plurality of repeater stations 2, which is generally the case. The clock signal H is transmitted, by the logic arrangement associated with the central unit 10, directly to an input of the clock recovery arrangement 13 for an effective frequency setting, whilst the binary signal (2 binary data streams) after demodulation by the demodulator of the receiver circuit 12 is applied to a second input of the arrangement 13. The arrangement 13 then effects a fast phase reset.

Figure 2:
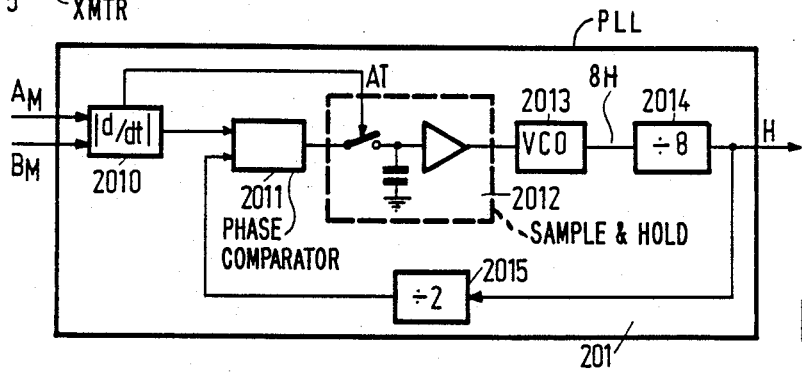
FIG. 2 shows a phase-locked loop used in the transmission direction from the central station to the remote stations.

FIG. 2 illustrates a phase-locked loop used in the transmission direction from the central station to the remote stations, that is to say in the multiplex direction. The phase-locked loop 201 (FIG. 1) will now be described briefly with reference to FIG. 2. The loop is provided, moreover, in each one of the receiver circuits (20, 30, 40, 50, ... ) of the remote stations (2, 3, 4, 5, ... ) for clock recovery in the multiplex direction.

The problems as regards the clock recovery occur for both the TDMA direction and the multiplex direction. However, in the latter case there is only one transmitting station and the synchronization is always effected on the same phase. In contradistinction, for the TDMA direction, synchronization must be effected at the start of each packet. The problems existing in the fast phase recovery are then absent, for the multiplex direction. This renders it possible to realize a phase-locked loop with sufficient inertia to ensure an appropriate frequency stability. This frequency stability will be utilized in the TDMA direction, since each TMDA receiver circuit (12, 22, FIG. 1) is associated with a multiplex transmitter circuit (11, 21, FIG. 1). The multiplex clock signal H of the multiplex transmitter circuit (11, 21, FIG. 1) is either the signal produced by the logic arrangement associated with the central unit 10 of the central station 1, or the recovered signal present at the output of the phase-locked loop 201 of a receiver circuit of a repeater station 2.

The demodulator of the receiver circuit 20 applies to the input of the phase-locked loop 201 two binary data streams $A_M$ and $B_M$ (resulting from the 4-phase modulation) of frequency H/4. The input of the phase-locked loop 201 is formed by a differentiating circuit 2010 performing the operation $|d/dt|$ (the absolute value of d/dt). The differentiating circuit has for its object to recover the clock information components contained in the two binary data streams $A_M$ and $B_M$ by revealing the totality of the transitions.

The output of the circuit 2010 applies the clock information components at the rate H/2 to an input of a phase comparator 2011 whose output is connected to the input of a sample-and-hold circuit 2012. A second output of the circuit 2010 controls opening of the sample-and-hold circuit 2012 with the aid of a control signal AT generated when an absence of a transition is detected. The sample-and-hold circuit 2012 actually serves to store the loop voltage in the absence of a transition. The output of the circuit 2012 is connected to the input of a voltage-controlled oscillator 2013 whose output signal has a frequency of 8H. In order to recover the clock signal H, the output signal of the oscillator 2013 is divided by 8 by means of a frequency divider circuit 2014 at whose output said clock signal H becomes available. This output signal is also conveyed to the phase comparator 2011. Actually the clock signal is first divided by 2 by means of a frequency divider circuit 2015. This signal of frequency H/2 is applied to a second input of the phase comparator 2011 to be compared to the signal of frequency H/2 present at the first input of the phase comparator. The parameters of the phase locked-loop 201 thus realized are optimized in such a manner as to provide the best possible compromise between the frequency stability and the acquisition time necessary to obtain this stability.

Figure 3:
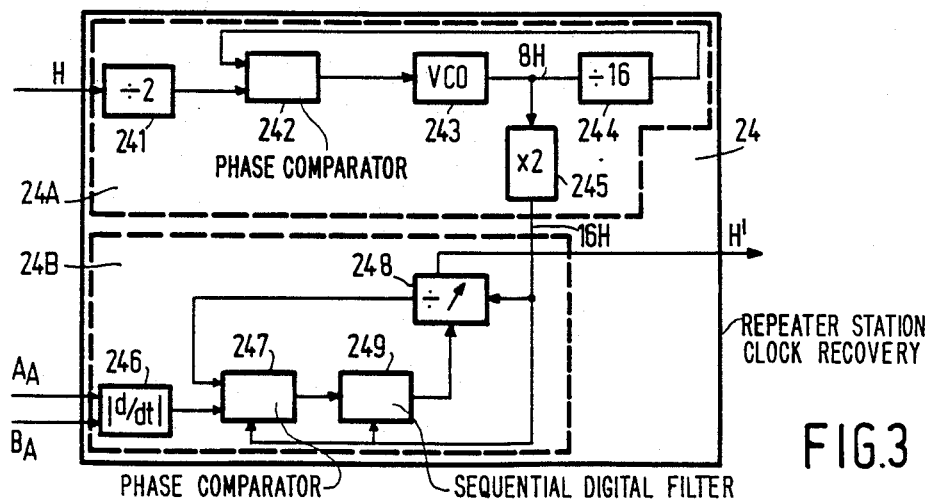
FIG. 3 shows a clock recovery arrangement according to the invention.

FIG. 3 shows a clock recovery arrangement according to the invention. This arrangement is used in the TDMA transmission direction and, in FIG. 1, is referenced by 24 when it is provided in a repeater station 2 and referenced by 13 when it is included in the central station 1. The TDMA clock recovery problem only exist in a repeater station or a central station. In FIG. 3 the clock recovery arrangement 24 is shown as being constituted by two loops. The first loop 24A is very similar to the phase-locked loop 201 described with reference to FIG. 2. The main difference is that it has neither a differentiating circuit nor a sample-and-hold circuit. In this case these circuits are superfluous, as this first loop is, in accordance with the basic idea of the invention, advantageously synchronized with the multiplex clock signal H and consequently all the clock transitions are always present. Thus, in a repeater station 2 the signal H at the input of the arrangement 24 is the clock signal recovered at the output of the phase-locked loop 201 (in the central station 1 the signal at the input of the arrangement 13 is the clock signal H sent directly by the logic arrangement associated with the central unit). The clock signal H is thus applied to the input of this first loop 24A where it is divided by 2 by means of a frequency divider circuit 241. The output of the circuit 241 is connected to an output of a phase comparator 242 which thus receives the signal of frequency H/2. The output of the phase comparator 242 is connected to the input of a voltage-controlled oscillator 243 at whose output the signal has a frequency 8H. Thereafter the output signal of the oscillator 243 is divided by 16 by means of a frequency divider circuit 244 whose output is fedback to a second input of the phase comparator 242 for comparing this signal of frequency H/2 to the signal of frequency H/2 present at the first input of the comparator 242. Thus an optimum frequency setting is realized. The signal used by the second loop 24B for a fast phase recovery is the output signal of the oscillator 243 which has been processed in the first loop 24A and whose frequency has been set with precision. This signal of a frequency 8H is multiplied by 2 (to obtain 16H) with the aid of a frequency multiplier circuit 245, which enables a correction accurate to 1/32 bit (defined with respect to H/2). Because the precision required for the system operating in accordance with the TDMA principle in order to control the delays of the stations is an accuracy to ⅛ bit (with respect to H/2), it should be noted that advantageously the precision as regards the phase control is four times better. The clock recovery in the TDMA direction is therefore reduced to a fast phase reset of the local signal on the data received.

The demodulator of the receiver circuit 22 applies two binary data streams $A_A$ and $B_A$ (resulting from the 4-phase modulation) of frequency H/4 to the input of the second loop 24B. The input of the second loop is constituted by a differentiating circuit 246 for performing the operation $|d/dt|$ (absolute value of d/dt). The differentiating circuit recovers the clock information components contained in the two binary data streams $A_A$ and $B_A$ by revealing the transitions of the signal present at this input. The clock information components outputted by the circuit 246 are applied at the rate H/2 to a first input of a phase comparator 247 to whose second input a signal of frequency H/2 is applied. The signal of frequency H/2 is compared to the signal present at the first input of the circuit 247. This comparison signal applied to the second input of said circuit 247 is supplied by a programmable frequency divider 248 which effects a division by 30, 31, 32, 33 or 34. The programmable frequency divider receives at one of its inputs the reference signal set to the frequency 16H and present at the output of the multiplier circuit 245 of the first loop thereby ensuring the link between the first and second loops. The signal of frequency 16H is also supplied to the phase comparator 247 for use as a sequencing clock. The programmable divider 248 divides the signal of frequency 16H by 32, when the phases of the signal of frequency H/2 at the input of the phase comparator are identical. The programmable divider 248 divdes by 30 or 31, when the signal of frequency 16H after division has a phase lag relative to the phase of the TDMA signal present at the output of the circuit 246, so as to offset the phade lead of the TDMA signal. The programmable divider 248 divides by 33 or 34, when the signal of the frequency 16H after division has a phase lead relative to the phase of the TDMA signal present at the output of the circuit 246, so as to offset the phase lag of the TDMA signal. Thus the phase is always corrected with respect to the TDMA signal in accordance with a procedure which will be described hereinafter with reference to FIG. 4a and in accordance with the output information of the phase comparator 247 which indicates leading, lagging or equality of the phase. It will be clear that the clock recovery arrangement 13 of the central station 1 is in its totality identical to the arrangement 24 described in the foregoing.

In accordance with a further aspect of the invention, the clock recovery arrangement whose second loop includes inter alia a programmable frequency divider is further characterized in that said programmable divider is preceded by a sequential digital filter. Actually, the information as regards the lag, lead or equality of the phase applied by the phase comparator 247 to the programmable divider 248 is too coarse for direct usage as a control information for the division factor. For that reason these information components are averaged by means of a sequential digital filter 249. The sequential digital filter 249 interprets said information components received from the phase comparator in accordance with a procedure described hereinafter (FIG. 5b). The sequential digital filter 249 also receives the signal of the frequency 16H which acts as a sequencing clock.

The output of the phase comparator 247 is connected to the input of the sequential digital filter 249. The sequential digital filter supplies at its output a control signal for the division factors, which signal is applied to an input of the programmable divider 248. The programmable divider 248 thus fedback then produces at its output, which is connected to an input of the receiver circuit 22, the clock signal H' of the TDMA clock necessary for reading the packets coming from the same remote station. The programmable divider 248 is then re-adjusted in accordance with the same procedure for reading the packets transmitted by another remote station etc. The clock signal H' is identical to the clock signal H as regards its frequency, but has a phase that is locked onto the input data signal.

The divider 248 programmable for a divide-by-30, −31, −32, −33 or −34 operation is, for example, constituted by an 8-bit counter that is assembled from two 4-bit counters arranged in cascade, fedback to the respective decimal positions 226, 225, 224, 223, 222 in accordance with the following Table:

| Counter value | Bit 8 (128) | Bit 7 (64) | Bit 6 (32) | Bit 5 (16) | Bit 4 (8) | Bit 3 (4) | Bit 2 (2) | Bit 1 (1) |
|---|---|---|---|---|---|---|---|---|
| 222 | 1 | 1 | 0 | 1 | 1 | 1 | 1 | 0 |
| 223 | 1 | 1 | 0 | 1 | 1 | 1 | 1 | 1 |
| 224 | 1 | 1 | 1 | 0 | 0 | 0 | 0 | 0 |
| 225 | 1 | 1 | 1 | 0 | 0 | 0 | 0 | 1 |
| 226 | 1 | 1 | 1 | 0 | 0 | 0 | 1 | 0 |
| 227 | 1 | 1 | 1 | 0 | 0 | 0 | 1 | 1 |
| 228 | 1 | 1 | 1 | 0 | 0 | 1 | 0 | 0 |
| 229 | 1 | 1 | 1 | 0 | 0 | 1 | 0 | 1 |
| 230 | 1 | 1 | 1 | 0 | 0 | 1 | 1 | 0 |
| 231 | 1 | 1 | 1 | 0 | 0 | 1 | 1 | 1 |
| 232 | 1 | 1 | 1 | 0 | 1 | 0 | 0 | 0 |
| 233 | 1 | 1 | 1 | 0 | 1 | 0 | 0 | 1 |
| 234 | 1 | 1 | 1 | 0 | 1 | 0 | 1 | 0 |
| 235 | 1 | 1 | 1 | 0 | 1 | 0 | 1 | 1 |
| 236 | 1 | 1 | 1 | 0 | 1 | 1 | 0 | 0 |
| 237 | 1 | 1 | 1 | 0 | 1 | 1 | 0 | 1 |
| 238 | 1 | 1 | 1 | 0 | 1 | 1 | 1 | 0 |
| 239 | 1 | 1 | 1 | 0 | 1 | 1 | 1 | 1 |
| 240 | 1 | 1 | 1 | 1 | 0 | 0 | 0 | 0 |
| 241 | 1 | 1 | 1 | 1 | 0 | 0 | 0 | 1 |
| 242 | 1 | 1 | 1 | 1 | 0 | 0 | 1 | 0 |
| 243 | 1 | 1 | 1 | 1 | 0 | 0 | 1 | 1 |
| 244 | 1 | 1 | 1 | 1 | 0 | 1 | 0 | 0 |
| 245 | 1 | 1 | 1 | 1 | 0 | 1 | 0 | 1 |
| 246 | 1 | 1 | 1 | 1 | 0 | 1 | 1 | 0 |
| 247 | 1 | 1 | 1 | 1 | 0 | 1 | 1 | 1 |
| 248 | 1 | 1 | 1 | 1 | 1 | 0 | 0 | 0 |
| 249 | 1 | 1 | 1 | 1 | 1 | 0 | 0 | 1 |
| 250 | 1 | 1 | 1 | 1 | 1 | 0 | 1 | 0 |
| 251 | 1 | 1 | 1 | 1 | 1 | 0 | 1 | 1 |
| 252 | 1 | 1 | 1 | 1 | 1 | 1 | 0 | 0 |
| 253 | 1 | 1 | 1 | 1 | 1 | 1 | 0 | 1 |
| 254 | 1 | 1 | 1 | 1 | 1 | 1 | 1 | 0 |
| 255 | 1 | 1 | 1 | 1 | 1 | 1 | 1 | 1 |

In these circumstances, in accordance with the preceding Table, the following statements hold when the (decimal) counter value (or counter position) at the preset instant is 255:

a division by 30 corresponds to the counter value of 226;

a division by 31 corresponds to the counter value of 225;

a division by 32 corresponds to the counter value of 224;

a division by 33 corresponds to the counter value of 223;

a division by 34 corresponds to the counter value of 222.

When studying the preceding Table for the counter values 222, 223, 224, 225, 226, it will be noted that the bits 7 and 8 are always in the 1 state, consequently a high level is continuously applied to these two, inter-connected, inputs. It will also be noted that the bits 5 and 6 are always complementary and that bit 5 is always in the same state as the bits 3 and 4, consequently the inputs corresponding to the bits 3, 4, 5 are mutually interconnected and the input corresponding to bit 5 is also connected to the corresponding input of bit 6 via an inverter circuit. The inputs corresponding to the bits 1, 2 and 3 are each connected to a division factor control output of the sequential digital filter 249. Thus, when there is applied to the respective inputs corresponding to the bits 1, 2 and 3:

the binary value 011, the corresponding division factor is 34;

the binary value 111, the corresponding division factor is 33;

the binary value 000, the corresponding division factor is 32;

the binary value 100, the corresponding division factor is 31;

the binary value 010, the corresponding division factor is 30.

As the clock input signal of the programmable divider 248 thus obtained is the signal having a frequency of 16H present at the output of the multiplier circuit 245 then the signal of the frequency H transmitted towards the receiving circuit 22 (FIG. 1) is present at the output of rank 4 (bit 4) and the phase resetting clock signal H/2 applied to the second input of the phase comparator 247 is present at the output of rank 5 (bit 5).

Figure 4A:
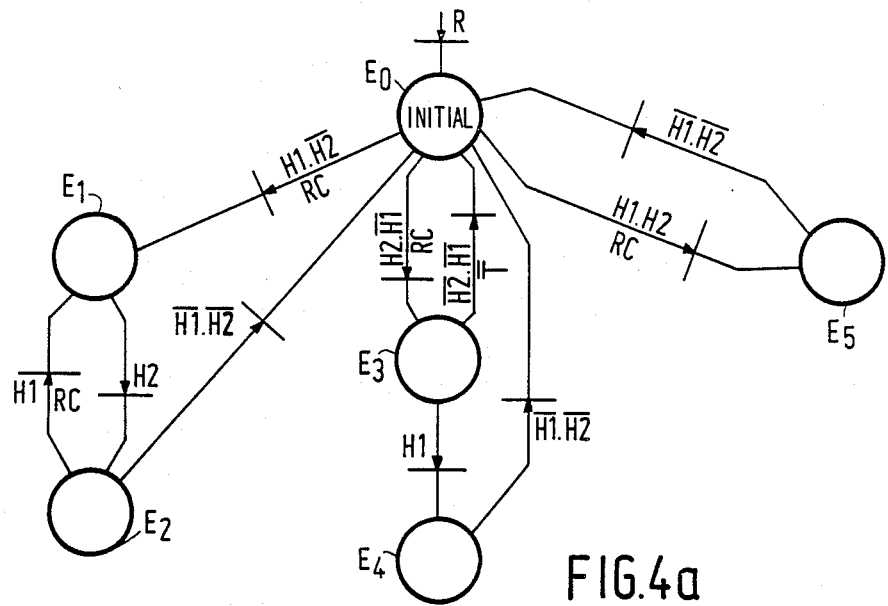
FIG. 4a shows a state diagram relating to the phase comparator used in the second loop and FIG. 4b shows a concise circuit diagram of said phase comparator.
Figure 4B:
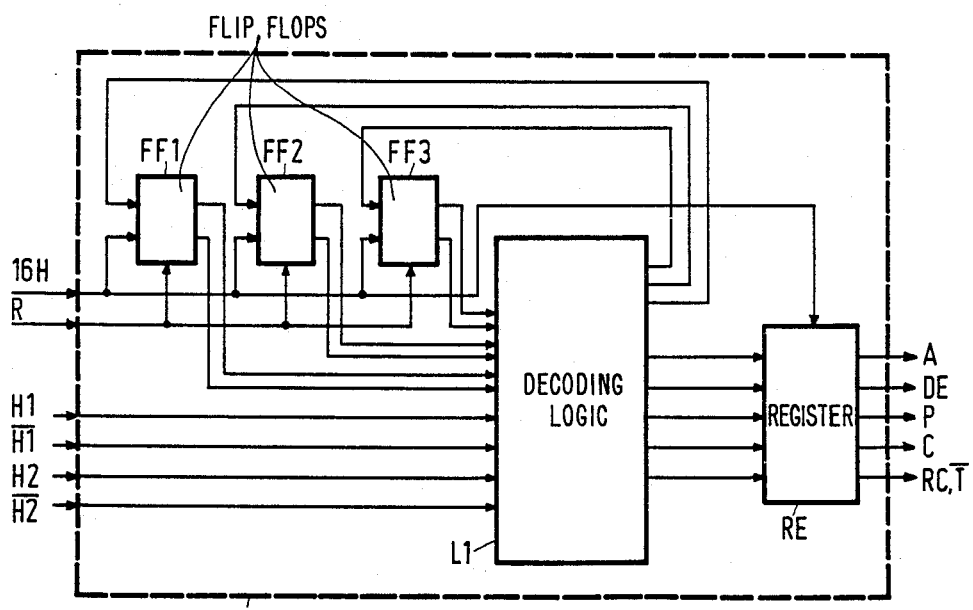

FIG. 4a is a state diagram relating to the phase comparator employed in the second loop 24B, FIG. 4b shows a concise circuit diagram of this phase comparator 247. The comparator 247 is a digital phase comparator which is actually constituted by a sequential automatic device. The sequencing clock is the signal of the frequency of 16H and the impulses applied to the inputs of the automatic device originate on the one hand from the detection of the transitions in the received data signals performed by the differentiating circuit 246 and on the other hand from the phase resetting clock signal at the output of rank 5 of the programmable divider 248.

The outputs convey the pulses relating to one of the three possible situations: phase lead, phase lag or phase equality in accordance with the sequence read at the inputs and in conformity with the state diagram described below.

For a proper understanding of the following description the impulse signal corresponding to the received data and outputted by the differentiating circuit 246 is denoted H1 or $\overline{H1}$ (depending on whether it is in the high or the low state, respectively) and its duration is equal to one period of the sequencing clock. The phase resetting clock signal outputted by the divider 248 is denoted H2 or $\overline{H2}$ (depending on whether it is in the high or low state, respectively). The signals H1, $\overline{H1}$, H2 and $\overline{H2}$ are input variables.

In the diagram of FIG. 4a, six states can be defined by means of, for example, three D-type flip-flops (FF1, FF2, FF3) which are clocked at the rate of the signal of frequency 16H. The state EO is the initial state (at the instant of circuit activation or the instant of cycle return) and if the available information is H1, $\overline{H2}$. The subsequent state is the state E1 decoded by means of a decoding logic (block L1) constituted, for example, by an array of logic circuits to whose inputs the input variables and the output states of the 3 D-flip-flops are transferred. The output states of the D-flip-flops are also transferred via the logic block L1 to a register RE which conveys the useful information to the sequential digital filter. The useful information includes phase delay DE, phase lead A, phase equality P, positioning C, reset-to-zero RC of a pulse counter provided at an input of the sequential digital filter and T which indicates the absence of the signal H1. When the circuit is activated or at the start of a cycle, the flip-flops are reset to zero (signal $\overline{R}$, which is a sync pulse).

Thus, when at the rate Eo the information $H1\overline{H2}$ has been decoded. The reset-to-zero RC of the output register of the phase comparator is set to its high state during a period of the sequencing clock to effect a reset-to-zero of the pulse counter at the input of the sequential digital filter. As the information $H1\overline{H2}$ indicates that the clock H1 of the received data leads the clock signal H2, the output C of the register RE of the comparator is set to a state such that the pulse counter can count the periods of the sequencing clock (16H) until the clock H2 itself rises. This is the transition to the state E2 during which a setting takes place for the output LEAD (output A) connected to a counter in the sequential digital filter for counting the information of the type LEAD. When the signal H2 goes down while the signal H1 is in the low state the phase comparator returns to the state EO.

However, when the signal H2 changes to the low state while the signal H1 is still in the high state, a double transition is detected. The double transition then causes the pulse counter to be reset to zero and a return to the state E1 occurs, followed by a transition to the state E2 when the clock H2 passes to the high state again. The cycle then becomes identical to the previously described cycle, when the clock H1 changes to the low state before the clock signal H2.

The same procedure is followed when the information $H1\overline{H2}$ reappears.

When in the state EO, the information $H2\overline{H1}$ is decoded, simultaneously the reset-to-zero RC of the output register RE of the phase comparator set to its high state to effect a reset-to-zero of the pulse counter at the input of the sequential digital filter. The output C of the register RE of the phase comparator is set to provide that the impulse counter counts at the rate of the signal of frequency 16H. This is the transition to the state E3. If the clock signal H2 goes down before the clock signal H1 rises, the counter stops counting and an absence of a transition in $H1(\overline{T})$ is detected, which information is transferred to the pulse counter of the sequential digital filter and a return to the state EO occurs. If in contrast therewith the clock signal H1 rises before the clock signal H2 goes down, the input information $H2\overline{H1}$ then indicates that the clock signal H1 lags the clock signal H2. The pulse counter controlled by the output C of the register RE then stops counting at the instant at which said clock signal H1 rises. This is the transition to state E4 during which a setting takes place for the output LAG (output DE) connected to a counter in the sequential digital filter for counting the information of the type LAG. When the signal H1 goes down, the phase comparator returns to the state EO. The same cycle is repeated when the information H2H1 reappears.

Finally, when in the state EO the information H1H2 is decoded, simultaneously the reset-to-zero RC of the output register RE of the phase comparator is set to its high state. This effects the reset-to-zero of the impulse counter at the input of the sequential digital filter. In that case, the input information indicates that the clock signals H1 and H2 change simultaneously to the high state and are in-phase. This is the transition to the state E5 during which a setting takes place for the output PHASE-EQUALITY (output P). This output is connected to a counter in the sequential digital filter for counting the information of the type PHASE-EQUALITY. When the clock signals H1 and H2 go down, the phase comparator returns to the state EO. This cycle is repeated until the information H1H2 reappears.

In this way, the digital phase comparator precedes the sequential digital filter and applies thereto the information of the type LEAD, LAG, PHASE-EQUALITY. It renders it also possible to effect the reset-to-zero operations of the pulse counters of the sequential digital filter. It also transfers counting information to the pulse counters. It is thus possible to determine the shift between the rising edges of the two clock signals H1 and H2. This information is used to define whether a division by 30 or by 31 must be effected for the case in which there is a simultaneous transfer of information of the LEAD type, or by 33 or 34 for the case in which there is a simultaneous transfer of information of the LAG type. The division by 32 is effected when information of the type PHASE-EQUALITY is transferred. Finally, the digital phase comparator renders it possible, when an absence of a transition is detected (a change from the state E3 to the state E0), to readjust the programmable divider to a division by 32, using this information.

Figure 5A:
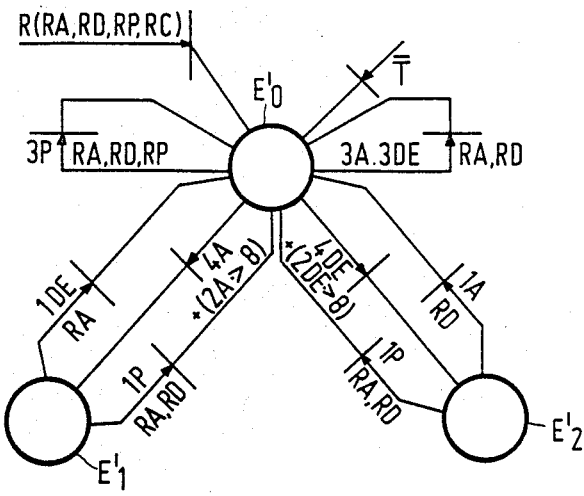
FIG. 5 shows a state diagram relating to the sequential digital filter and FIG. 5b shows a concise circuit diagram of the sequential digital filter.
Figure 5B:
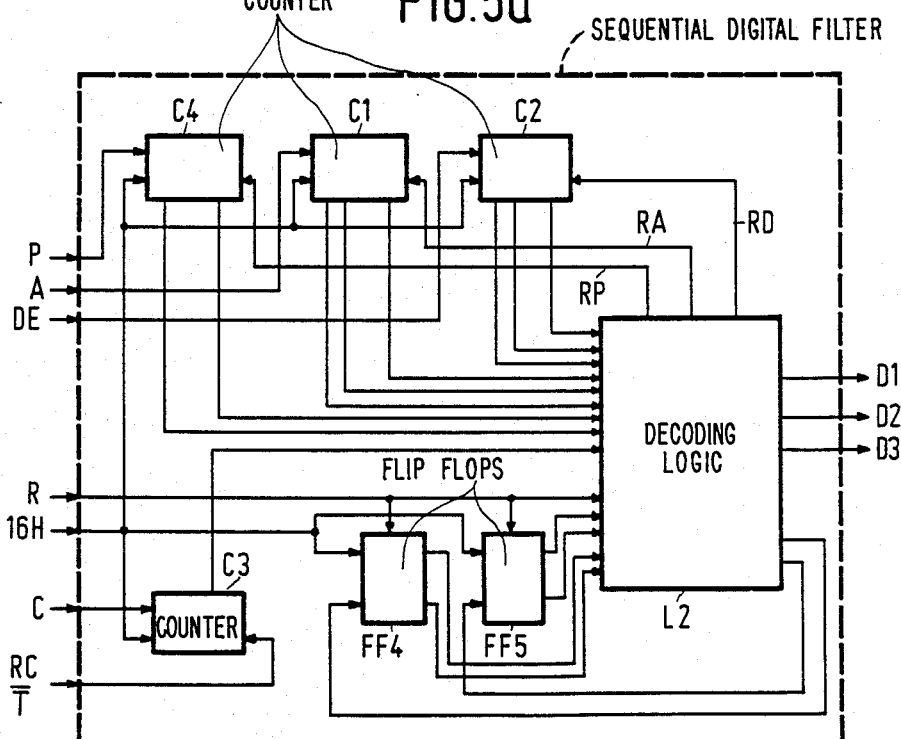

FIG. 5a is a state diagram relating to the sequential digital filter 249 provided advantageously between the digital phase comparator 247 and the programmable divider 248. FIG. 5b is a concise circuit diagram of the sequential digital filter. The sequential digital filter is also constituted by a sequential automatic device whose sequencing clock signal is also the signal of frequency 16H. The inputs of this automatic device receive the information outputted directly or indirectly by the digital phase comparator 247. The information used directly is the phase-equality information P and the absence-of-transition information $\overline{T}$. The information used indirectly is the information of the type LEAD (A), LAG (DE) and the counting information C. The last three types of information are used after passage through respectively a counter C1 counting the information of the type LEAD, a counter C2 counting the information of the type LAG and a pulse counter C3 which has already been mentioned in the description with reference to FIG. 4. Counting the information P of the phase-equality type H is effected by a counter C4.

The sequential digital filter intepretes the information outputted by the phase comparator in accordance with the following criteria.

When 4 pulses of the LEAD type have been counted or simultaneously two pulses of the LEAD type and a deviation exceeding 8 bits, a command to divide by 30 is given when the deviation detected is greater than or equal to 8 bits. A command to divide by 31 is given instead when the deviation detected is less than 8 bits. All this happens as long as information of the type LEAD is received. As soon as one information of the type LAG or one information of the PHASE-EQUALITY type is received, the programmable divider is re-adjusted to the divide-by-32 position.

When 4 pulses of the LAG type have been counted, or simultaneously 2 pulses of the type LAG and a deviation exceeding 8 bits, a command by divide by 34 is given when the deviation detected is greater than or equal to 8 bits. A command to divide by 33 is given instead when the deviation detected is less than 8 bits. All this happens as long as information of the LAG type is received. As soon as one information of the LEAD type or one information of the PHASE-EQUALITY type has been counted, the programmable divider is re-adjusted to the divide-by-32 position.

When 6 pulses have been counted and they are predominantly of the LEAD or LAG type (that is to say 3 pulses of the LEAD type and 3 pulses of the LAG type), the sequence is re-initialised and a command to divide by 32 is given.

Finally, when a pulse of the PHASE-EQUALITY type has been received an order to divide by 32 is given. After reception of 3 pulses of this type, the counters counting the information of the type LEAD, LAG or PHASE-EQUALITY are reset to zero.

Used thus, the sequential digital filter renders it possible to correct advantageously and rapidly a significant phase deviation. A significant phrase deviation might be, for example, a deviation of 16 bits during the reception of 16 information pulses of the LEAD or the LAG type, that is to say 32 clock bits out of the 40 available bits (2×20 transitions). 8 bits or 2×4 transitions thus remain for completing, if necessary, the phase control. This filter simultaneously effects an effective filter operation by averaging the output information of the digital phase comparator. This output information is too coarse to be suitable for direct usage as a division command for the programmable divider.

The state diagram of FIG. 5a shows three states E'0, E'1 and E'2 corresponding to the division by 32, by 30 or 31 and by 33 or 34, respectively. These three states are defined by means of, for example, two D-type flip-flops (FF4, FF5) which are clocked at the rate of the signal of frequency 16H. This signal having the frequency 16H is used at the same time as the clock signal for the LEAD counter C1, LAG counter C2 and PHASE-EQUALITY counter C4 and for the pulse counter C3. The states are decoded by means of a decoding logic (block L2). The decoding logic L2 is constituted by, for example, an array of logic circuits to whose inputs the output states of the three LEAD, LAG, and PHASE-EQUALITY counters and the output states of the 2 D-flop-flops are applied. The decoding logic L2 renders it also possible to effect a reset-to-zero for the three counters LEAD (signal RA), LAG (signal RD) and PHASE-EQUALITY (signal RP). By means of 3 of the outputs of L2, the division commands D1, D2, D3 are given to the programmable divider. The pulse counter C3 renders it possible to determine whether the phase shift is greater than or equal to 8 bits. The pulse counter C3 thus supplies the necessary information to command the division either by 30, if simultaneously the LEAD counter C1 has counted at least two pulses, or by 34 if simultaneously the LAG counter C2 has counted at least two pulses.

When the device is activated, the 2 D-flip-flops (FF4, FF5) are reset to zero (signal R which is a sync pulse). The 4 counters C1, C2, C3, C4 are likewise reset to zero (signals RA, RD, RP with the aid of the logic L2 and the signal RC). Consequently, the activation of the device corresponds to a division by 32. Each information indicating the absence of the transition $\overline{T}$ causes a division by 32 without reset-to-zero for the counters C1, C2, C4. The division by 32 is represented by the state E'O. This state E'O is preserved if, after the reception of 6 consecutive pulses, 3 pulses have been counted by the LEAD counter (3A) and 3 pulses by the LAG counter (3DE) or vice versa. At the end of counting these 6 pulses a reset-to-zero is effected for the LEAD counter (RA) and the LAG counter (RD).

When 4 pulses of the LEAD type (4A) are counted by the LEAD counter C1 or when 2 pulses of the LEAD type are counted and there exists a deviation exceeding 8 bits (2A.<8), a transition to the state E'1 takes place. That is to say, a change is effected to a division by 30 when the pulse counter C3 has registered a shift greater than or equal to 8 bits or a command to divide by 31 if the shift is less than 8 bits. In the state E'1, if the counter C4 detects PHASE-EQUALITY once (1P), a return to the E'O state (division by 32) is effected and at the same time a reset-to-zero is effected for the LEAD counter (RA) and the LAG counter (RD). If likewise, in the state E'1, one information of the LAG type (1D) is counted by the LAG counter C2, a return to the E'O state is effected (division by 32) and at the same time a reset-to-zero is effected for the LAG counter (RA).

Inversely, when 4 pulses of the LAG type (4DE) are counted by the LAG counter C2 or when 2 pulses of the LAG type are counted and there exists a deviation greater than 8 bits (2DE.−8) a transition to the state E'2 takes place. That is to say, a transition to the division by 34 takes place when the pulse counter C3 has registered a shift greater than or equal to 8 bits or to the division by 33 when the shift is less than 8 bits. In the state E'2, if PHASE-EQUALITY is detected once (1P) by the counter C4, a return to the state E'O is effected (division by 32) and at the same time a reset-to-zero is effected for the LEAD counter (RA) and the LAG counter (RD). If in this same state E'2, one information of the LEAD type (1A) is counted by the LEAD counter C1, a return to the state E'O (division by 32) is effected and at the same time a reset-to-zero is effected for the LAG counter (RD).

Finally, if in the state E'O (division by 32) 3 consecutive pulses are counted by the PHASE-EQUALITY counter C4 (3P), this state is of course maintained (and so the division by 32), but in addition the LEAD, LAG and PHASE-EQUALITY counters are reset to zero by the respective signals RA, RD, RP.

Thus, the sequential digital filter applies, via its 3 respective outputs D1, D2, D3, the division commands to 3 of the inputs of the programmable divider corresponding to the bits 1, 2 and 3 in accordance with the following codes:

binary value 011 corresponding to a division by 34;
binary value 111 corresponding to a division by 33;
binary value 000 corresponding to a division by 32;
binary value 100 corresponding to a division by 31;
binary value 010 corresponding to a division by 30.

What is claimed is:

1. A clock recovery arrangement suitable for an information transmission system using the time-division multiple-access (TDMA) principle in one transmission direction, the system including a central station and remote stations, each station having at least one transmitter circuit and one receiver circuit, information sent by the transmitter circuit of the central station to the receiver circuits of the remote stations being time-division multiplexed and synchronised by means of a phase-locked loop disposed within the central station, said phase-locked loop producing at least a multiplex clock signal, whilst information sent by the transmitter circuits of the remote stations is transmitted to the receiver circuit of the central station in accordance with said TDMA principle and is synchronised upon reception, at the central station, by the clock recovery arrangement which comprises:

a dual loop for fast phase reset, the dual loop comprising:
  a. a first loop, distinct from said phase-locked loop, which includes an oscillator, which is locked onto said multiplex clock signal and which supplies a reference signal; and
  b. a second loop, distinct from said phase-locked loop, which includes:
    i. a phase comparator;
    ii. a programmable frequency divider coupled to receive said reference signal; and
    iii. a sequential digital filter coupled between said phase comparator and said programmable frequency divider to average input information to said programmable frequency divider.

2. A clock recovery arrangement as claimed in claim 1, wherein the frequency of said reference signal produced by said oscillator is a multiple of the frequency of said multiplex clock signal.

3. The clock recovery arrangement of claim 1 wherein
  a. the first loop further comprises:
    i. a divide-by-two frequency divider coupled to receive the multiplex clock signal;
    ii. a second phase comparator having first and second inputs and an output, the first input being coupled to receive an output of the divide-by-two frequency divider and the output being coupled to a control input of said oscillator;
    iii. the oscillator producing the reference signal having a frequency whwich is eight times the frequency of the multiplex clock signal;
    iv. a multiply-by-two frequency multiplier having an input coupled to receive the reference signal, and an output coupled to an input of the programmable frequency divider;
    v. a divide-by-sixteen frequency divider having an input coupled to receive said reference signal and an output coupled to the second input of said second phase comparator; and
  b. the second loop further comprises:
    i. an absolute value differentiator for detecting transitions in the information sent by the transmitter circuits of the remote stations and having an output;
    ii. the phase comparator having a first input coupled to the output of the absolute value differentiator and a second input coupled to an output of the programmable frequency divider; and
    iii. the programmable frequency divider supplying a recovered clock signal, which recovered clock signal has a phase locked into the phase of the information sent by the transmitter circuits of the remote stations.

4. The clock recovery circuit of claim 1 wherein:
  a. the programmable frequency divider supplies a recovered clock signal;
  b. the phase comparator comprises a first input coupled to receive the recovered clock signal and a second input coupled to receive a signal derived from the information sent by the transmitter circuits of the remote stations; and
  c. the sequential digital filter supplies an output signal which indicates whether the recovered clock signal tends, on the average, to lead, or lag, or have phase equality with the information sent by the transmitter circuits of the remote stations, the output signal of the sequential digital filter controlling the programmable frequency divider to change a frequency dividend which is applied to said reference signal so that the recovered clock signal is locked in phase to the information sent by the transmitter circuits of the remote stations.

5. The arrangement of claim 1 wherein the central station is a repeater and the remote stations are end stations.

6. The arrangement of claim 1 wherein at least one of the remote stations is a repeater.

* * * * *